C. W. FRANCIS.
SUBSOILER ATTACHMENT FOR PLOWS.
APPLICATION FILED MAY 25, 1920.
1,358,836.
Patented Nov. 16, 1920.
2 SHEETS—SHEET 2.
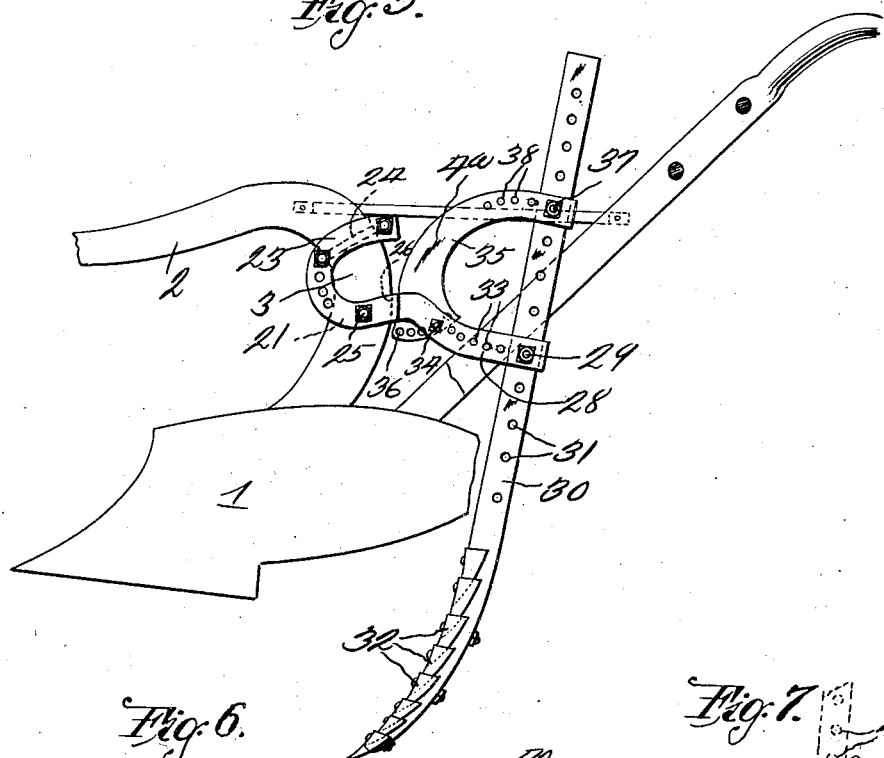
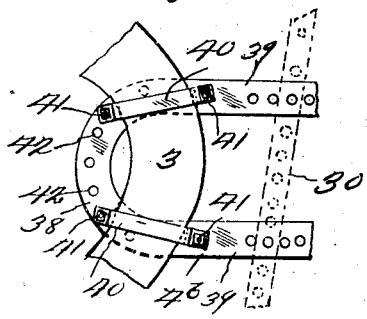
Inventor
Charles W. Francis
By D. Swift
Attorney

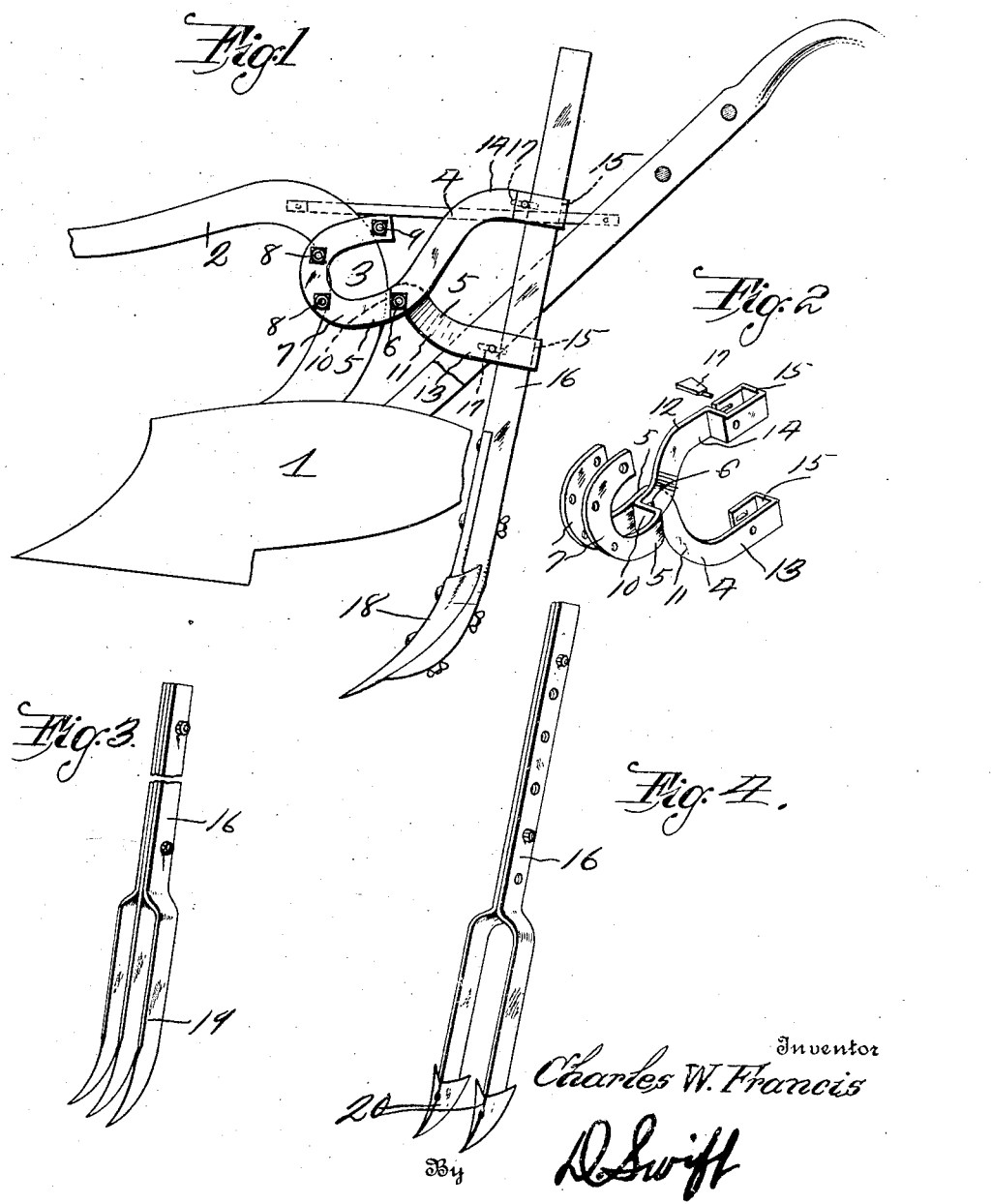

UNITED STATES PATENT OFFICE.

CHARLES WILLIS FRANCIS, OF MURFREESBORO, ARKANSAS.

SUBSOILER ATTACHMENT FOR PLOWS.

1,358,836.  Specification of Letters Patent.  Patented Nov. 16, 1920.

Application filed May 25, 1920. Serial No. 384,011.

*To all whom it may concern:*

Be it known that I, CHARLES W. FRANCIS, a citizen of the United States, residing at Murfreesboro, in the county of Pike, State of Arkansas, have invented a new and useful Subsoiler Attachment for Plows; and I do hereby declare the following to be a full, clear, and exact description of the invention, such as will enable others skilled in the art to which it appertains to make and use the same.

The invention relates to plow attachments and has for its object to provide an attachment whereby subsoilers carried by plow standard may be easily and quickly attached to the plow beam without changing the structure of the plow and also to provide means whereby said plow standard may be adjusted at various angles and also adjusted so that the subsoiler shovel carried by the plow standard will make different depths of cut.

A further object is to provide a subsoiler attachment for plow beams, said subsoiler attachment comprising a bracket which may be easily and quickly attached to the rear bowed portion of the plow beam so that its arms will extend rearwardly and to provide the rearwardly extending arms with means for receiving and holding a plow standard to which may be attached a subsoiler.

A further object is to provide a detachable subsoiler for plows which subsoiler is carried by a bracket attached to the plow beam, and to so construct the bracket that the subsoiler may be positioned in various positions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of a plow showing the subsoiler attached thereto.

Fig. 2 is a perspective view of the subsoiler bracket.

Fig. 3 is a perspective view of a plow standard showing a double colter.

Fig. 4 is a perspective view of a plow standard showing a double colter.

Fig. 5 is a side elevation of a portion of a plow showing a subsoiler carried by a modified form of bracket.

Fig. 6 is a detail view showing another form of bracket.

Fig. 7 is a detail view showing another form of bracket.

Referring to the drawings, the numeral 1 designates a conventional form of plow and 2 the beam thereof. The plow beam is of a conventional form and is provided with the bowed portion 3, to which portion the subsoiler bracket is detachably secured. Referring more especially to Figs. 1 and 2 it will be seen that the subsoiler supporting bracket 4 is formed from two members 5, which are secured together as at 6. Members 5 are provided with U-shaped portions 7, which U-shaped portions have the same curvature and register with each other and are adapted to receive therebetween the bowed portions 3 of the plow beam. U-shaped portions 7 are provided with transversely disposed bolts 8 and 9, bolts 8 being disposed forwardly of the bowed portion 3 and the bolt 9 rearwardly. When the bolts 8 and 9 are tightened it will be seen that the bracket 4 will be securely clamped on the bowed portion 3 of the plow beam. One of the members 5 is bent as at 10 so as to form an engaging shoulder adapted to engage the convexed rear edge of the bowed portion 3 so as to additionally hold the bracket as a whole against pivotal action. Members 5 are provided with oppositely extending curved arms 11 and 12, which arms terminate in substantially parallel portions 13 and 14, which portions are bent so as to form U-shaped members 15 for the reception of the plow standard 16, said plow standard being held in place by means of the jam wedges 17, said wedges forming means whereby the plow standard may be held in various positions. Plow standard 16 extends downwardly at a point to the rear of the plow beam and is provided with a subsoiler shovel 18, which subsoiler shovel may be of any form, if so desired it may be a triple colter 19 as shown in Fig. 3 or a double colter 20 as shown in Fig. 4.

From the above it will be seen that a bracket is provided which may be easily and quickly attached to a plow beam in such a manner that it will support a subsoiler plow standard at various angles and that the subsoiler shovel 18 may be adjusted to take various depths of cuts. It will also be seen that the bracket may be attached to any conventional form of plow without changing the structure of the plow.

Referring to the form shown in Fig. 5 it will be seen that the bracket 4ª comprises a member 21 having a U-shaped portion 23 which is clamped and held on the bowed portion 3 of the plow beams 2 by means of a U-bolt 24 and a bolt 25, which passes through the portion 3 of the plow beam. Member 23 extends rearwardly and is provided with a shoulder 26 adapted to engage the rear convexed edge of the bowed portion 3 and beyond which shoulder 26 the member is provided with an arm 28, to the rear end of which is secured by means of a bolt 29 to a plow standard 30, which may carry a plurality of cultivator shovels 32. Plow standard 30 is provided with a plurality of apertures 31, through any one of which the bolt 29 may pass for holding the plow standard at different distances from the ground according to the depth of cut desired. The arm 28 is provided with a series of apertures 33, which apertures may be placed in registration with any of the apertures 31 so that the plow standard 30 may be adjusted to various angles. Secured to the member 21 as at 34 is a segmentally shaped plate 35, the lower end of said plate being provided with a series of apertures 36 which apertures may be placed in registration with any of the apertures 33 when it is desired to change the angle of the plow standard 30. The upper end of the plate 35 is secured to the plow standard 30 by means of a bolt 37 which passes through one of the apertures 38 and one of the apertures 31. It will be seen that the member 21 is securely fastened to the bowed portion 3 and that the plow standard may be adjusted at various angles and it also may be adjusted to various positions upwardly and downwardly.

Referring to Fig. 6, it will be seen that the bracket 4ᵇ comprises a U-shaped member 38 having rearwardly extending arms 39, said arms being provided with apertures so that the plow standard 30 may be adjustably attached thereto. The U-shaped member 38 being held on bowed portion 3 of the plow by means of straps 40 which arch the plow beam and may be adjusted to various positions by means of the bolts 41 and apertures 42.

Referring to Fig. 7 it will be seen that the structure is practically the same as that shown in Fig. 6 except that instead of the arm 39 at the upper side of the U-shaped member 8, said arm 39ª is cut off and an angularly disposed brace bar 43 is provided. Brace bar 43 is provided with a series of apertures 44, which apertures are adapted to register with anyone of the apertures 45 in the plow standard 30. The lower end of the bar 33 being secured to the arm 39 as at 46 and may be additionally secured to said arm by means of a bolt 47. Arm 39 is provided with a series of apertures 48, anyone of which may be placed in registration with anyone of the apertures 49 of the plow standard 30 and may be secured thereto by means of a bolt 50.

From the above it will be seen that subsoiler attachment for plow beams is provided which may be easily and quickly attached to any conventional form of plow beam and it will also be seen that an attachment of this character is provided which may be adjusted for different depths of cuts and at different angles.

The invention having been set forth what is claimed as new and useful is:—

The combination with a plow having a beam provided with a rear bowed portion, of a subsoiler therefor, said subsoiler comprising a plow standard having a subsoiling element, a bracket carried by the bowed portion of the plow beam, said bracket comprising two members, the forward ends of said members being provided with similarly shaped U-shaped member, said U-shaped members extending forwardly, upwardly and rearwardly and adapted to engage the sides of the bowed portion of the plow beam, securing means passing through said U-shaped members and disposed forwardly and rearwardly, of the bowed edges of the plow beam, said U-shaped portions merging into upwardly and rearwardly extending arms, bearings in said arms for the reception of the plow standard, and means passing through said arms for holding the plow standard in various positions.

In testimony whereof I have signed my name to this specification in the presence of two subscribing witnesses.

CHARLES WILLIS FRANCIS.

Witnesses:
LUE D. FRANCIS,
CATHRIN E. FRANCIS.